(12) United States Patent
Bauer et al.

(10) Patent No.: US 11,941,218 B2
(45) Date of Patent: Mar. 26, 2024

(54) INPUT DEVICE WITH A TOUCHSCREEN OR TOUCHPAD AND INPUT PART WITH SNAP HAPTICS LOCATED THEREIN

(71) Applicant: PREH GMBH, Bad Neustadt a. d. Saale (DE)

(72) Inventors: Norbert Bauer, Bad Neustadt (DE); Thomas Kleffel, Höchberg (DE)

(73) Assignee: PREH GMBH, Bad Neustadt A. D. Saale (DE)

( * ) Notice: Subject to any disclaimer, the term of this patent is extended or adjusted under 35 U.S.C. 154(b) by 163 days.

(21) Appl. No.: 17/269,309

(22) PCT Filed: Aug. 27, 2020

(86) PCT No.: PCT/EP2020/074003
§ 371 (c)(1),
(2) Date: Feb. 18, 2021

(87) PCT Pub. No.: WO2021/069145
PCT Pub. Date: Apr. 15, 2021

(65) Prior Publication Data
US 2022/0308706 A1    Sep. 29, 2022

(30) Foreign Application Priority Data
Oct. 7, 2019   (DE) .................... 10 2019 126 849.4

(51) Int. Cl.
*G06F 3/044*   (2006.01)
*G06F 3/01*    (2006.01)
(Continued)

(52) U.S. Cl.
CPC ............ *G06F 3/0447* (2019.05); *G06F 3/016* (2013.01); *G06F 3/0362* (2013.01);
(Continued)

(58) Field of Classification Search
CPC ...... G06F 3/0447; G06F 3/016; G06F 3/0362; G06F 3/0416; G06F 2203/04106;
(Continued)

(56) References Cited

U.S. PATENT DOCUMENTS

2015/0378496 A1* 12/2015 Vandermeijden ..... G06F 3/0445
345/174
2019/0362914 A1  11/2019 Yano et al.

FOREIGN PATENT DOCUMENTS

CN       110301022 A    10/2019
DE    102010010574 A1 *  9/2011
(Continued)

OTHER PUBLICATIONS

Machine translation of DE2018000111U1 (Year: 2019).*
(Continued)

*Primary Examiner* — Patrick N Edouard
*Assistant Examiner* — Joseph P Fox
(74) *Attorney, Agent, or Firm* — M&B IP Analysts, LLC

(57) ABSTRACT

The invention relates to an input device comprising: a touch-sensitive input surface facing towards an operator (B); a detection device for the spatially resolved detection of an approach towards and touch on the touch-sensitive input surface having a sensor array for capacitive and/or inductive detection, which extends parallel to the input surface; an input part, which is disposed on the input surface and mounted so as to be movable from a rest position ($X_0$) into an actuation position ($X_E$) along an actuating direction ($B_1$) extending perpendicularly to the input surface, for enabling a performance of an operating input by the operator (B) through a manual displacement of the input part along the actuating direction ($B_1$); a position indicator for contactless position detection, which is attached to the input part and cooperates with the detection device; restoring means for
(Continued)

generating a restoring force (F) with snap haptics counteracting the manual shifting from the rest position ($X_0$); wherein the detection device is designed for acquiring a course over time of an approach towards the touch-sensitive input surface by means of a course over time of a sensor signal ($Z(t)$) of the detection device and to analyze the course over time of the sensor signal ($Z(t)$) and/or an associated frequency spectrum, and is further designed to assign a switching or controlling function exclusively if it was found in the preceding analysis that the course over time of the sensor signal ($Z(t)$) and/or the associated frequency spectrum has characteristics that are predefined by the snap haptics.

9 Claims, 2 Drawing Sheets

(51) Int. Cl.
*G06F 3/0362* (2013.01)
*G06F 3/041* (2006.01)

(52) U.S. Cl.
CPC .. *G06F 3/0416* (2013.01); *G06F 2203/04106* (2013.01); *G06F 2203/04108* (2013.01)

(58) Field of Classification Search
CPC ......... G06F 2203/04108; G06F 3/0393; G06F 3/0338; G06F 3/044; G06F 3/0412; G01L 1/127; G01L 1/144
See application file for complete search history.

(56) References Cited

FOREIGN PATENT DOCUMENTS

| | | |
|---|---|---|
| DE | 102016121076 A1 | 5/2018 |
| DE | 102017114990 | 10/2018 |
| DE | 102018119590 A1 | 4/2019 |
| DE | 2018000111 U1 * | 5/2019 |
| WO | 2018150740 A1 | 8/2018 |

OTHER PUBLICATIONS

Machine translation of DE 10 2010 010 574 A1 (Year: 2011).*
Request for Examination for German Patent Application No. 10 2019 126 849.4, dated Oct. 7, 2019, German Patent and Trademark Office, Munich, Germany.
The International Search Report and The Written Opinion of the International Searching Authority for PCT/EP2020/074003, dated Nov. 20, 2020, ISA/EP, Rijswijk, The Netherlands.
Chinese Office Action for Application No. CN202080004961.3, dated May 4, 2023.

* cited by examiner

INPUT DEVICE WITH A TOUCHSCREEN OR TOUCHPAD AND INPUT PART WITH SNAP HAPTICS LOCATED THEREIN

CROSS-REFERENCE TO RELATED APPLICATIONS

This application claims priority under 35 U.S.C. § 371 to the International Application No. PCT/EP2020/074003, filed Aug. 27, 2020, and to the German Application No. 10 2019 126 849.4, filed Oct. 7, 2019, now, the contents of which are hereby incorporated by reference.

The invention relates to an input device, particularly for a motor vehicle, with at least one touch-sensitive input surface optionally supplemented with a display surface formed by a pixel matrix display. Generically, an input part is movably mounted on this touch-sensitive input surface. This is, for example, a rotary knob so that the input part functions as a rotary adjuster. A combination of a pixel matrix display and a detection device for providing a touch-sensitive input and display surface is commonly also referred to as a touchscreen, whereas the variant without a display is regularly referred to as a touchpad. In order to detect an approach toward or touch on the input surface, a capacitive detection device is typically provided, which has an electrode structure for generating an array of measuring capacitances, the influence on which, caused by approach or touch, can be detected in a spatially resolved manner by the detection device.

Input devices of this type are used in motor vehicles for controlling vehicle components and, among other things, serve for controlling information or communication devices or for climate control. Examples include a music file player, a navigation device or a control surface for setting vehicle functions.

The creation of an additional option for a manual operating input by disposing a movably mounted input part on a touchscreen is advantageous in that the operator is able to haptically orientate himself more easily without checking visually, and the manual operating input can most frequently be carried out, via the input part, more rapidly and most frequently completely without visual checking, compared with an input via the touch-sensitive input surface, e.g. by means of a swiping gesture. DE 10 2006 043 208 A1 discloses a rotary adjuster disposed on a touchscreen. For example, the input part is provided for running through an operating menu or for selecting one or more menu items. The detection setting, which is provided anyway, is used to detect the position of the input part, wherein a position indicator, which is synchronously moved along with the input part when the latter is adjusted, cooperates with the detection device and causes an influence on the measuring capacitances. Due to the spatially resolving detection of the capacitive influence on these measuring fields, it is thus possible not only to detect the touch on the input surface but also the position of the input part, because the input part is provided with a position indicator influencing the measuring fields in a position-dependent manner.

However, the detection of the shifting of the input part involves problems particularly if the input part has a degree of freedom to be detected in which it is moved perpendicularly to the input surface, i.e. when the location of the approach of the position indicator relative to the touch-sensitive input surface during manual shifting, i.e. when pushing down the input part, changes only to a small degree. The detection of a so-called push actuation has proved to be particularly susceptible to error and, until knew now, could hardly be distinguished from a random approach, e.g. an inadvertent approach of a finger of the operator, towards the input surface.

Against this background, there was a demand for a solution for a generic input device with a touch-sensitive input surface and an input part which is additionally arranged thereon and which is capable of detecting more reliably the shifting of the input part in a direction perpendicular to the input surface, and which can be realized, particularly, in a space-saving and/or cost-effective manner. This object is achieved with an input device according to claim 1. An equally advantageous use and a method for operating a corresponding input device are each the subject matter of co-ordinated claims. Advantageous embodiments are in each case the subject matter of the dependent claims. It must be noted that the features cited individually in the claims can be combined with each other in any technologically meaningful manner and represent other embodiments of the invention. The description, in particular in connection with the figures, additionally characterizes and specifies the invention.

The invention relates to an input device. The input device serves for carrying out one or more control and switching operations by manual actuation of an operator. According to the invention, the input device has a touch-sensitive input surface facing towards an operator. That may have a planar, i.e. two-dimensional, configuration, or also a three-dimensional one, i.e. with one or more raised portions or depressions, which thus forms a haptic landscape. According to the invention, a detection device is provided in order to detect in a spatially resolved manner an approach towards and touch on the touch-sensitive input surface, e.g. by an operating means, such as a finger of an operator. According to the invention, the detection device has at least one sensor array for capacitive and/or inductive detection of an approach or touch, which extends parallel to the input surface. For example, an array of several electrodes producing an arrangement of measuring capacitances or an array of induction coils is provided. An array of electrodes for the projected capacitive touch or approach detection is preferably provided.

According to the invention, an input part is provided, which is disposed on the input surface and mounted so as to be movable from a rest position into an actuation position along an actuating direction extending perpendicularly to the input surface, in order to enable a performance of an operating input by the operator through a manual displacement of the input part along the actuating direction. For example, the input part is movably mounted on a base, which in turn is fixed to the input surface in a detachable manner, preferably in a detachable and reversibly fixable manner. In addition to the degree of freedom perpendicular to the input surface, which is compulsory according to the invention, i.e. in addition to the push function of the input part, other degrees of freedom may be provided; for example, the input part is mounted so as to be rotatable about an axis of rotation perpendicular to the input surface and/or pivotable relative to the input surface, in order to enable other control or switching functions by shifting the input part. Most preferably, at least one rotary adjustment of the input part about an axis of rotation perpendicular to the input surface is made possible in addition to the movability in a direction perpendicular to the input surface.

According to the invention, the input device comprises a position indicator for contactless position detection, which cooperates with the detection device and is fixed to the input part. The term position indicator is to be interpreted broadly.

For example, an electrode of a metallic material, which moves synchronously with the input part, is provided as a position indicator. For example, the position indicator is arranged in such a way that it is disposed in an electrically insulated manner with respect to the operator or is in electrically conductive contact with the operator when the input part is touched by the operator on the surfaces intended to be touched. In another configuration, the position indicator is configured as an electric oscillating circuit whose tuning varies with a shifting of the input part.

According to the invention, the restoring means are configured for generating a restoring force with snap haptics counteracting the manual shifting from the rest position. In other words, the input part is mounted to be monostable in the rest position. Snap haptics is understood to be a force-path behavior with an action point, i.e. that the restoring force that counteracts the actuation and is to be overcome by the operator first increases as the input part is progressively moved from the rest position into the actuation position, also referred to as actuated position, then reaches a first local maximum, the so-called action point, prior to reaching the actuation position, in order to then drop without reaching zero. It is provided, not compulsorily, but preferably, that in that case, the restoring force increases again prior to reaching the actuation position or, at the latest, upon reaching the actuated position, because the movement of the input part is provided with a stop.

Preferably, snap haptics, in which the restoring force causing the restoring action first rises as the input part progressively moves from the actuated position in the direction of the rest position, then reaches a second local maximum prior to reaching the rest position, in order to then drop, is also perceptible during the movement of the input part from the actuated position back into the rest position. Preferably, a hysteresis behavior becomes evident in the process, i.e., the deflection of the input part at which the local first maximum of the restoring force is reached is not identical to the deflection of the input part at which the second local maximum of the restoring force is reached. Preferably, the deflection determined with respect to the rest position is greater at the first local maximum than the deflection at the second local maximum.

According to the invention, the detection device is designed for acquiring a course over time of an approach, e.g. of the operator's finger or of the position indicator, towards the touch-sensitive input surface by means of a course over time of a sensor signal of the sensor array and to analyze the course over time of the sensor signal and/or an associated frequency spectrum. According to the invention, it is further designed to assign a switching or controlling function exclusively if it was found in the preceding analysis that the previously measured course over time of the sensor signal and/or the frequency spectrum, which was determined from the previously measured course over time, e.g. obtained by Fourier analysis, has characteristics that are predefined by the snap haptics.

Taking into account, according to the invention, the course over time of the signal and thus the course of the approach based on a detection signal in combination with the restoring action including the snap haptics is advantageous in that the characteristics with which the movement of the input part is provided by the snap haptics is easily discernible in the course over time of the course of the detection, and that thus, an inadvertent other approach can be easily distinguished from an approach that is intentional and caused by the actuation of the input part and the associated approach of the position indicator towards the touch-sensitive input surface. Thus, the latter can be more reliably detected. In other words, not only is the snap haptics advantageous with respect to haptic feedback, but enforces a movement profile of the input part when actuated, which has a characteristic connection with the snap haptics and can thus be easily identified as an intended actuation of the input part in the course over time of the sensor signal, because the latter, according to the invention, is the basis of the further analysis of the detection device.

According to a preferred embodiment, it is provided that a course over time of the sensor signal, as a compulsory precondition for the further analysis, is qualified as an approach suitable for assigning a controlling or switching function only if the detection signal exceeds or drops below a predefined limit value. For example, the limit value is determined by the detection signal which results when the input part is located in a position preceding the actuation position, e.g. deflected halfway between the rest position and the actuation position, or even more preferably in a position in which the restoring force reaches the first local maximum, i.e. is located at the action point, in order thus to suppress the further analysis and erroneous triggering in the case of an unintended actuation or touch.

Preferably, the course over time is high-pass filtered prior to the analysis, in order to be better able to disqualify, in the further analysis, comparatively slow approaches of body parts towards the touch-sensitive input surface, which take place without an actuation of the input part or which take place during actuations up to the action point, and thus not assign them any switching and control functions.

Preferably, the cutoff frequency of the high-pass filtering is defined by the interval in time that has elapsed between reaching, for the first time, a first deflection (point of action) defined by a local maximum of the restoring force during a manual shifting of the input part from the rest position along the actuating direction in the direction of the actuation position, and subsequently reaching, repeatedly, a value of the restoring force corresponding to the local maximum before reaching the actuation position at a second deflection.

Furthermore, the invention relates to a use of the above-described input device in a motor vehicle.

The invention further relates to an operation of an input device with the following steps. In a providing step, an input device in one of the previous embodiments is provided. In an acquisition step, a course over time of an approach, e.g. of the position indicator or a finger of an operator, towards the touch-sensitive input surface is acquired by means of a sensor signal of the sensor array associated with the detection device. In a subsequent analysis step, the course over time of the sensor signal and/or an associated frequency spectrum is analyzed. In a subsequent assigning step, a switching or controlling function is assigned exclusively if it was found in the analysis step that the course over time and/or the associated frequency spectrum has characteristics that are predefined by the snap haptics, in order to thus assign in a more reliable manner the approach of the position indicator towards the touch-sensitive input surface to the switching or control function.

Taking into account, according to the invention, the course over time of the approach based on a detection signal in combination with the restoring action including the snap haptics is advantageous in that the characteristics with which the movement of the input part is provided by the snap haptics is easily discernible in the course over time of the course of the detection, and that thus, an inadvertent other approach can be easily distinguished from an approach that is caused by the actuation of the input part and the associated approach of the position indicator towards the touch-sensitive input surface. In other words, not only is the snap haptics advantageous with respect to haptic feedback, but enforces a movement profile of the input part when actuated, which has a characteristic connection with the snap haptics and can thus be easily identified as an intended actuation of the input part, because the course over time of the detection signal, according to the invention, is the basis of the further analysis of the detection device.

According to a preferred embodiment of the operating method, it is provided that a course over time of the sensor signal, as a compulsory precondition for the further analysis, is qualified as an approach only if the detection signal exceeds or drops below a predefined limit value. For example, the limit value is determined by the detection signal which results when the input part is located in a position preceding the actuation position, e.g. deflected halfway, or in a position in which the restoring force reaches the local maximum, in order thus to suppress the further analysis and erroneous triggering in the case of an unintended actuation or touch.

Preferably, the course over time is high-pass filtered prior to the analysis, in order to be better able to disqualify, in the further analysis, comparatively slow approaches of body parts towards the touch-sensitive input surface, which take place without an actuation of the input part, and thus not assign them any switching and control functions.

Preferably, the cutoff frequency of the high-pass filtering is defined by the interval in time that has elapsed between reaching, for the first time, a first deflection (point of action) defined by a local maximum of the restoring force during a manual shifting of the input part from the rest position along the actuating direction in the direction of the actuation position, and subsequently reaching, repeatedly, a value of the restoring force corresponding to the local maximum before reaching the actuation position at a second deflection. For example, the cutoff frequency is defined as follows: $f_{gr}=1/\Delta t$ with a snap time $\Delta t$ in the range of 2 milliseconds to 10 milliseconds.

The invention is explained further with reference to the following Figures. The Figures are to be understood only as examples and each merely represent a preferred embodiment. In the Figures.

Figure 1:
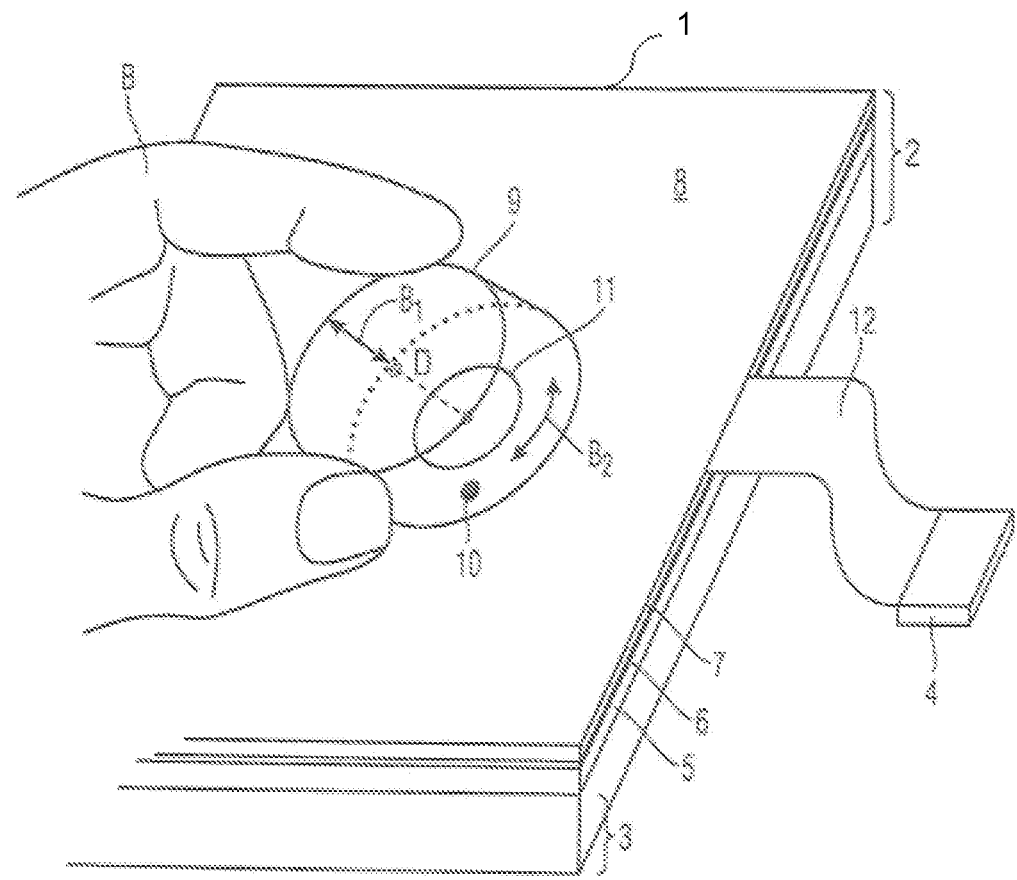
FIG. 1 shows a perspective view of an embodiment of the input device 1 according to the invention.

The input device 1 according to the invention is intended for use in a motor vehicle that is not shown, and is disposed, for example, in a center console or a dashboard that is part of the vehicle, and serves for the performance of operating inputs by an operator B. A rotatably mounted input part 9 and a touch-sensitive input surface 8 are provided for this purpose. While the touch-sensitive input surface 8 serves for carrying out a conventional input including a touch, such as a swiping gesture and the like, the input part 9 permits an operating input by the operator B by shifting the input part along a first actuation direction $B_1$ and a second actuation direction $B_2$. On the one hand, the input part 9 is mounted on the input surface 8 so as to be rotatable about an axis D of rotation orthogonal to the touch-sensitive input surface 8, in order thus to permit the performance of a rotary input by the operator B along the second actuation direction $B_2$. Moreover, the input part 9 can be translationally displaced from a rest position into an actuation position along a first actuation direction $B_1$, which is perpendicular to the input surface 8 and parallel to the axis D of rotation, resulting in a push functionality of the input part 9, and thus of the input device 1. In this case, the actuation position constitutes the position of the input part 9 with the closest point of approach towards the input surface 8, and the rest position constitutes the position of the input part 9 with the greatest distance from the input surface 8. A deflection is understood to be the change of position of the input part relative to the rest position.

Since the input part 9 is easily haptically perceptible, it permits simpler re-locating and aids the orientation on the touch-sensitive input surface 8. A detection device 4, 6, which includes an electrode array 6, for the spatially resolved and capacitive detection of a touch on the input surface 8 and an approach towards the input surface 8 is formed, by means of which the touch or approach is detected capacitively by locally influencing an array of measuring capacitances produced by the electrode array 6. The electrode array 6 is produced by a coating associated with the touch-detection device 4, 6, which forms a regular structure and extends parallel to the input surface 8. The electrode array 6 is formed from transparent electrodes organized in columns and lines. The application of the measuring capacitances to the electrode structure 6, the detection of the influence thereon and the acquisition of an approach or touch with the associated location of the touch are carried out by an evaluation unit 4 associated with the detection device 4, 6 and disposed outside the layer structure 2.

The electrode array 6 is disposed on a side of a transparent outer layer 7 of the layer structure 2 facing away from the operator B, wherein the outer layer is formed from a glass material or transparent plastic, whereas the side of the transparent outer layer 7 of the layer structure 2 facing towards the operator B defines the touch-sensitive input surface 8. An adhesive layer 5 consisting of a UV-curing, transparently curing adhesive is provided between the transparent outer layer 7 and a pixel matrix display 3. The combination and stacked arrangement of the touch-sensitive input surface 8 and the pixel matrix display 3 resulting therefrom qualifies it as a touchscreen. The shift or position of the input part 9 is detected by the detection device 4, 6 by the latter cooperating with a position indicator 10, which is attached to the input part 9 and thus moves synchronously with the latter in the case of a manual shift carried out by the operator B, and thus influences the measuring capacitances produced by the electrode structure 6 depending on the position. The configuration of the position indicator 10 shown is to be understood merely symbolically. An arrangement and embodiment of the position indicator 10 other than that illustrated by the Figure may be provided. For example, an eccentric positioning with respect to the axis D of rotation of the input part 9 is also possible, as well as a positioning on the axis D of rotation. The electrode array 6 is connected in an electrically conductive manner with the evaluation unit 4 located outside the layer structure 2. Restoring means 11 are provided, which are indicated merely schematically and which produce a restoring force that counteracts the shifting of the input part 9 during the manual shift from the rest position into the actuation position along the first actuation direction $B_1$, generating snap haptics in the process. The approach of the position indicator 10 towards the measuring capacitances produced by the electrode array, which is caused by the manual actuation, results in a change over time of a sensor signal, whose course over time is the basis of an analysis by the evaluation unit 4.

Figure 2:
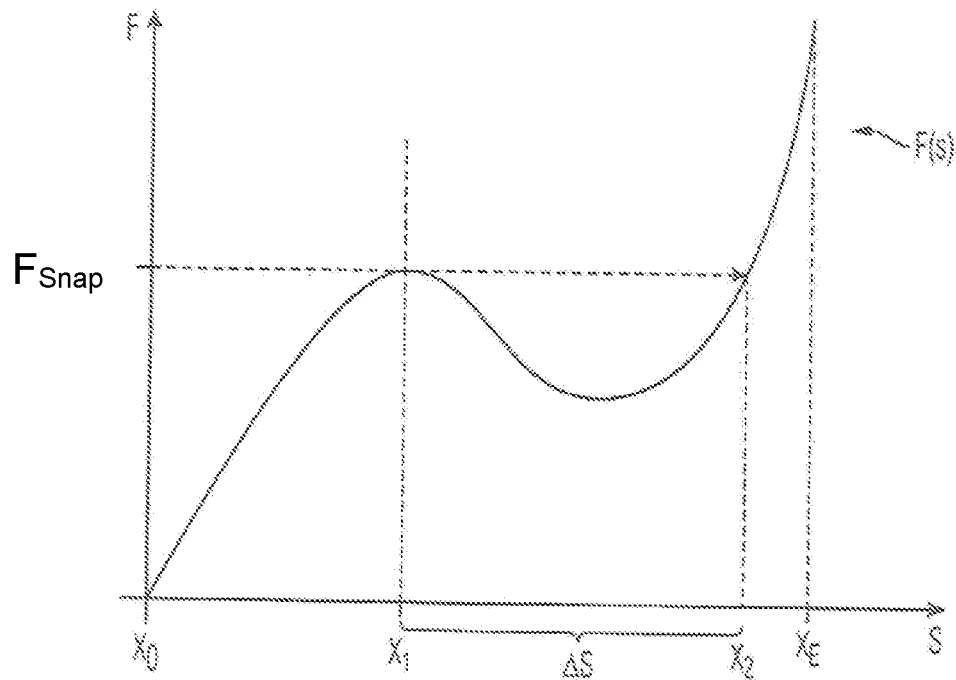
FIG. 2 shows a course of the restoring force F(S)
Figure 3:
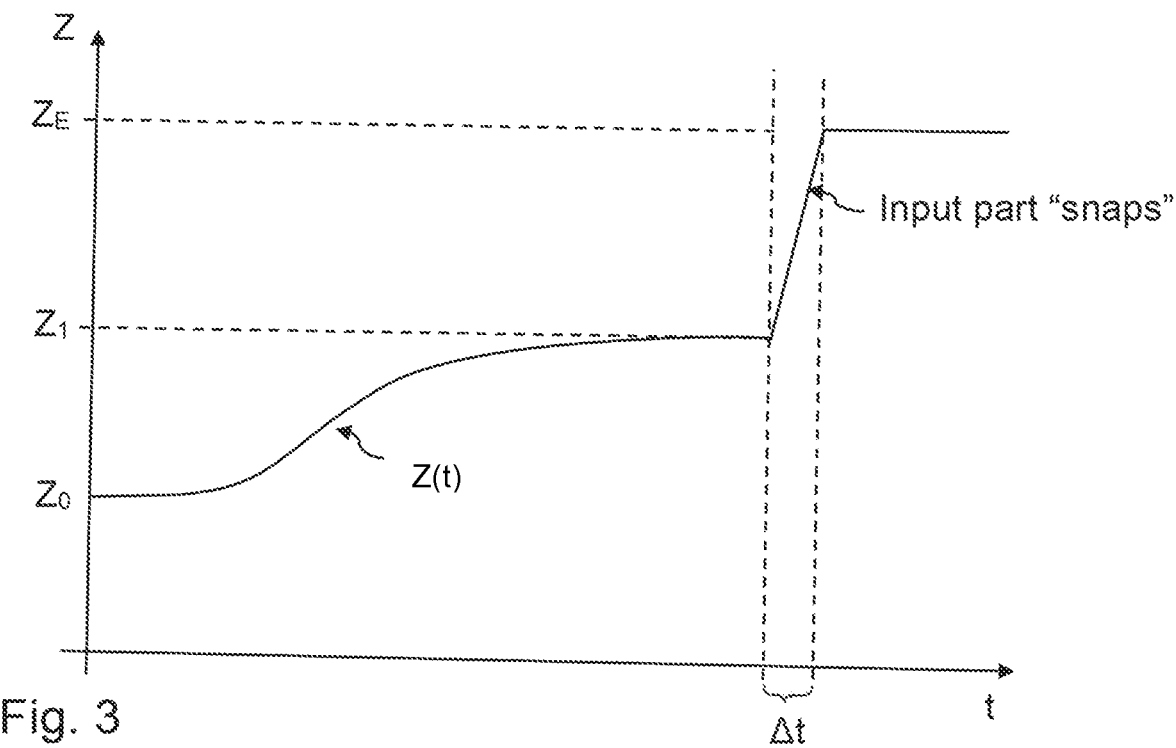
FIG. 3 shows a course of the sensor signal Z(t).

The snap haptics are explained in more detail with reference to FIG. 2. It shows the course of the restoring force F(S) as a function of the deflection S of the input part from the rest position, which is labeled $X_0$. The actuation position, which results from the input part being provided with an end stop, is marked $X_E$. As is clear from the course of the restoring force F, there is a local maximum of the restoring force $F_{snap}$ at the deflection $X_1$, the so-called "action point". Thereafter, the restoring force first drops across the snap deflection $\Delta S$, only to then rise exponentially again. The snap deflection $\Delta S$ is defined by the distance between the deflection $X_1$ with the local maximum $F_{snap}$ and the deflection $X_1$ when this restoring force value $F_{snap}$ is reached again directly before reaching the actuation position $X_E$ as the final position. The time interval required for traversing the snap deflection, the so-called snap time $\Delta t$, is substantially determined by the snap haptics and not, or only to a small extent, by the actuation speed at which the operator carries out the input, and is therefore a characteristic quantity determined by the snap haptics. Preferably, the snap time is in the range of 2 milliseconds to 10 milliseconds. The course of the sensor signal $Z(t)$ as a function of time is explained with reference to FIG. 3. It is found that the first touch on the input part in its rest position by the operator, which precedes the actuation, causes a first signal value $Z_0$ in the course over time of the signal $Z(t)$. The sensor signal $Z(t)$ increases and, as the local maximum $F_{snap}$ of the restoring force F for the deflection $X_1$ is reached, reaches the value $Z_1$. Then, the snap haptics cause a rapid rise of the sensor signal $Z(t)$ to the signal value $Z_E$ over the snap time $\Delta t$, with the actuation position $X_E$ finally being reached by the input part.

In the further evaluation and analysis by the evaluation unit 4 shown in FIG. 1, exceeding the limit value $Z_1$ is therefore a compulsory precondition for assigning a switching or controlling function. If this limit value is not exceeded, no assignment is carried out by the evaluation unit 4. Moreover, a high pass frequency filter is used. The cutoff frequency of this filter is selected in accordance with the snap time: $f_{gr}=1/\Delta t$, wherein the snap time $\Delta t$ is in the range of 2 milliseconds to 10 milliseconds.

The invention claimed is:

1. An input device, comprising:
 a touch-sensitive input surface facing towards an operator (B);
 a detection device for spatially resolved detection of an approach towards and touch on the touch-sensitive input surface having a sensor array for capacitive and/or inductive detection, which extends parallel to the input surface;
 an input part, which is disposed on the input surface and mounted so as to be movable from a rest position ($X_0$) into an actuation position ($X_E$) along an actuating direction ($B_1$) extending perpendicularly to the input surface, for enabling a performance of an operating input by the operator (B) through a manual displacement of the input part along the actuating direction ($B_1$), the input part further being rotatably mounted so as to be able to rotate around an axis along the actuating direction ($B_1$);
 a position indicator for contactless position detection, which is fixed to the input part and cooperates with the detection device; and
 restoring means for generating a restoring force (F) with snap haptics counteracting the manual shifting from the rest position ($X_0$) for the input part, wherein the restoring force (F) has a force-path behavior with a local maximum (Fsnap) of the restoring force (F) in between the rest position ($X_0$) and the actuation position ($X_E$) and wherein a characteristic of the snap haptics is a snap time defined by a time interval required for traversing a snap deflection defined by a distance between a first deflection ($X_1$) at which the local maximum (Fsnap) of the restoring force is achieved and a second deflection ($X_2$) at which this maximum is reached again before reaching a maximum deflection of the input part;
 wherein the detection device is designed for acquiring a course over time of an approach towards the touch-sensitive input surface by means of a course over time of a sensor signal ($Z(t)$) of the sensor array and to analyze the course over time of the sensor signal ($Z(t)$) and/or an associated frequency spectrum, and is further designed to assign a switching or controlling function exclusively if it was found in the preceding analysis that the course over time of the sensor signal ($Z(t)$) and/or the associated frequency spectrum has characteristics that are predefined by the snap time of the snap haptics.

2. The input device according to claim 1, wherein the course over time of the sensor signal ($Z(t)$) is high-pass filtered prior to the analysis.

3. The input device according to claim 2, wherein a cutoff frequency ($f_{gr}$) of the high-pass filtering is defined by the interval in time between reaching, for a first time, the first deflection ($X_1$) defined by the local maximum ($F_{snap}$) of the restoring force (F) in the case of a manual shifting of the input part from the rest position ($X_0$) along the actuating direction ($B_1$), and subsequently reaching, repeatedly, a value of the restoring force (F) corresponding to the local maximum ($F_{snap}$) before reaching the actuation position ($X_E$) at a second deflection ($X_2$).

4. The input device according to claim 1, wherein a course over time of the sensor signal ($Z(t)$), as a compulsory precondition for the further analysis, qualifies for assigning a switching or controlling function exclusively if the sensor signal ($Z(t)$) exceeded or dropped below a predefined limit value ($Z_1$).

5. Use of the input device according to claim 1 in a motor vehicle.

6. A method of operation of an input device, the input device comprising:
 a touch-sensitive input surface facing towards an operator (B);
 a detection device for spatially resolved detection of an approach towards and touch on the touch-sensitive input surface having a sensor array for capacitive and/or inductive detection, which extends parallel to the input surface,
 an input part, which is disposed on the input surface and mounted so as to be movable from a rest position ($X_0$) into an actuation position ($X_E$) along an actuating direction ($B_1$) extending perpendicularly to the input surface, for enabling a performance of an operating input by the operator (B) through a manual displacement of the input part along the actuating direction ($B_1$), the input part further being rotatably mounted so as to be able to rotate around an axis along the actuating direction ($B_1$);
 a position indicator for contactless position detection, which is fixed to the input part and cooperates with the detection device; and
 restoring means for generating a restoring force (F) with snap haptics counteracting the manual shifting from the rest position ($X_0$) for the input part, wherein the restoring force (F) has a force-path behavior with a local maximum (Fsnap) of the restoring force (F) in between the rest position ($X_0$) and the actuation position ($X_E$), and wherein a characteristic of the snap haptics is a snap time defined by a time interval required for traversing a snap deflection defined by a distance between a first deflection ($X_1$) at which the local maximum (Fsnap) of the restoring force is achieved and a second deflection ($X_2$) at which this maximum is reached again before reaching a maximum deflection of the input part;

the method comprising:

acquiring a course over time of an approach towards the touch-sensitive input surface by means of a course over time of a sensor signal (Z(t)) of the sensor array;

analyzing the course over time of the sensor signal (Z(t)) and/or an associated frequency spectrum; and exclusively assigning a switching or controlling function if it was found in the analysis step that the course over time of the sensor signal (Z(t)) and/or the associated frequency spectrum has characteristics that are predefined by the snap time of the snap haptics.

7. The operation of the input device according to claim 6, wherein the course over time of the sensor signal (Z(t)) is high-pass filtered prior to the analysis.

8. The operation of the input device according to claim 7, wherein a cutoff frequency ($f_{gr}$) of the high-pass filtering is defined by the interval in time between reaching, for a first time, the first deflection ($X_1$) defined by the local maximum ($F_{snap}$) of the restoring force (F) in the case of a manual shifting of the input part from the rest position ($X_0$) along the actuating direction ($B_1$), and subsequently reaching, repeatedly, a value of the restoring force (F) corresponding to the local maximum ($F_{snap}$) before reaching the actuation position ($X_E$) at a second deflection ($X_2$).

9. The operation of the input device according to claim 6, wherein a course over time of the sensor signal (Z(t)), as a compulsory precondition for the further analysis, qualifies for assigning a switching or controlling function exclusively if the sensor signal (Z(t)) exceeded or dropped below a predefined limit value ($Z_1$).

* * * * *